(No Model.)
C. A. MEZGER.
COMPOSITE ELECTRIC CONDUCTOR.
No. 477,951. Patented June 28, 1892.
Fig. 1.
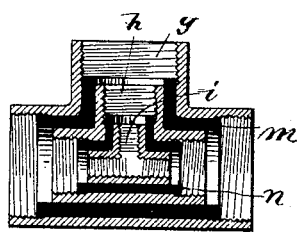
Fig. 2.
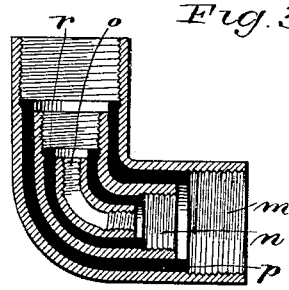
Fig. 3.
Fig. 4.
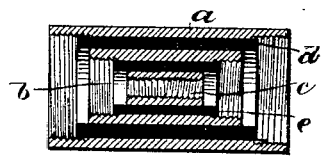
Fig. 5.
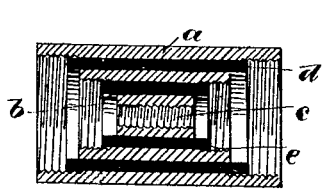
WITNESSES:
Paul Johst
C. Sedgwick
INVENTOR:
C. A. Mezger
BY Munn & Co
ATTORNEYS

UNITED STATES PATENT OFFICE.

CHARLES A. MEZGER, OF BROOKLYN, NEW YORK.

COMPOSITE ELECTRIC CONDUCTOR.

SPECIFICATION forming part of Letters Patent No. 477,951, dated June 28, 1892.

Application filed October 30, 1891. Serial No. 410,322. (No model.)

*To all whom it may concern:*

Be it known that I, CHARLES A. MEZGER, of Brooklyn, in the county of Kings and State of New York, have invented a new and useful Improvement in Composite Conductors for Electric Circuits, of which the following is a full, clear, and exact description.

My invention relates to conductors for the transmission of electricity when these are grouped to convey electric currents in parallel, and has for its object to provide means for the compact assemblage of two or more electric conductor mediums and the complete insulation of each from others.

A further object is to provide novel means for the branching of lateral conductors from main lines, producing angular deviations from straight lines of conductor mediums, or coupling together of two or more composite conductor-sections and effectually insulating each conductor from an adjacent conductor.

To these ends my invention consists in the peculiar construction and combination of parts, as is hereinafter described and claimed.

Reference is to be had to the accompanying drawings, forming a part of this specification, in which similar letters of reference indicate corresponding parts in all the figures.

Figure 1 is a partly sectional view of the improved composite conductor broken away at one end, showing means for an insulation of three concentrically-assembled conductors and means to join said conductors to a novel coupling for an insulated connection of a similar conductor-section. Fig. 2 is an axial section of a composite coupling and a lateral branch thereon adapted to join two of the composite conductors shown in Fig. 1 in axial alignment and connect therewith a laterally-projecting composite conductor of similar construction. Fig. 3 is an axial section of a composite conductor-coupling adapted to connect two sections of the joined conductors shown in Fig. 1 at right angles to each other and preserve their insulation. Fig. 4 is an axial section of a composite socket or sleeve coupling adapted to couple two sections of the composite conductor shown in Fig. 1 and align them, the opposite ends of the concentric sockets being tapped with oppositely-pitched threads; and Fig. 5 is an axial section of a socket-coupling similar in construction to that shown in Fig. 4, but threaded the same pitch at each end.

The composite conductor for electricity shown in Fig. 1 consists of a wire strand or rod A, covered with any suitable non-conductor B, whereon a second electric conductor C of a tubular form is placed, the interposed non-conducting material being adapted to fill the space between completely and hold the tubular conductor concentric with the one first named. Upon the electric conductor C an insulating material D is secured to form an even coating between the tubular conductor mentioned and another external tubular conductor E, that is thus maintained concentric with the conductors A and C, which conductors may be made of any convenient length.

To facilitate the connection of the concentric electric conductors A C E with similar conductor-sections, and thus produce a composite electric conductor of any desired length, the ends of these conductors are extended one beyond the other, as shown, the central rod or wire conductor A, projecting a suitable distance beyond the tubular conductor C, which latter is similarly projected beyond the exterior tubular conductor E, and all of these pieces are cut with screw-threads at each end of a composite conductor-section.

In order to extend a line of three main conductors a required distance from a source of electric generation, if several composite conductor-sections are required to effect this, the composite socket or sleeve-couplings shown in Figs. 4 and 5 are employed, which, as indicated, consist each of a set of three tubular pieces *a b c*, concentrically arranged, with suitable non-conducting material *d e* interposed between these pieces, so as to insulate them from each other. At each end of the external piece *a* internal threads are formed, which are designed to engage with the external threads of two similar exterior conductors E. The sleeve-piece *b* is also internally threaded and adapted to fit upon the threaded end portions of two tubular conductors C of similar composite conductor-sections, this piece being made proportionally shorter than the external piece *a* of the coupling to adapt it to simultaneously engage the threaded end portion of the conductor C when the threaded end of the external conductor E is entering the outer piece *a* of the composite socket. The central socket-piece *c* is also internally threaded at each end to receive the end portions of two wire-rod conductors A, which are to be employed, and is reduced proportionately in length to suit the projecting ends of the rods named, so that two composite electric conductor-sections may be joined together and the insulation of each individual conductor A C E be maintained at the points of junction. To insure such an insulation at the ends of the conductors which are joined, the insulations *d* and *e* between the socket-pieces *a b c* are extended in advance of the socket ends, so as to fill up any space that may intervene when the parts are screwed together.

It will be evident that if the composite socket shown in Fig. 4 is used and the ends of composite conductor-sections that are to be joined are threaded right and left handed to mate similar threads at opposite ends of the socket-pieces forming this composite socket, the latter may be made to join two aligning sections of a composite conductor by simply entering the ends of the conductor-sections within opposite ends of the composite socket-coupling and rotating the latter in a proper direction, this form of a coupling being advantageous when two lines of conductors having considerable length are to be joined.

The socket-coupling shown in Fig. 5 being tapped for the connection of composite conductor-sections that are both cut with right-hand threads may be employed to successively connect composite conductor-sections, and thereby form a composite conductor of any desired length, having its concentric conductors A C E perfectly insulated from each other.

When it is desired to connect one or more branch composite conductors similar to that shown in Fig. 1 with a main line having an equal number of concentric electric conductors assembled in a like manner, the coupling shown in Fig. 2 is employed, which consists of a set of T-pieces *g h i* concentrically assembled and held spaced apart by the similarly-formed insulators *m* and *n*, that are intermediately placed, so as to adapt each T-piece to have a threaded connection with the threaded ends of composite conductor-sections made like Fig. 1, said insulations having their end portions projected beyond the ends of the concentric T's to insure good insulation where the parts connect, each of the T's *g h i* being graded in length from the outer one inwardly, so as to permit a simultaneous connection therewith of the composite conductor-sections, as has already been explained with regard to the socket-couplings shown in Figs. 4 and 5.

In Fig. 3 there is a composite coupling shown for the insulated connection of two composite conductors at a right angle to each other, this coupling being composed of three L's *m n o*, concentrically assembled and separated by intermediate insulations *p r*, the L's being successively reduced in length and diameter to allow such an arrangement of parts and also to permit the ends of composite conductor-sections to engage with each of the concentric L's, the insulations between adjacent L's projecting beyond the ends of the L's for the purpose of perfecting the insulation between these pieces and the concentric conductors A C E, that may be screwed into them.

It will be evident that a greater number of electric conductors in tubular form may be assembled and insulated, as stated, and that the component parts of the couplings (shown in Figs. 2, 3, 4, and 5) may be correspondingly increased within the scope of my invention, the essential features of which comprise concentrically-arranged tubular conductors, a central wire-rod conductor, and couplings of corresponding construction, the parts of the composite conductor-sections and the couplings being held separated by intervening insulations.

Having thus fully described my invention, I claim as new and desire to secure by Letters Patent—

1. A composite electric conductor made up of sections, each section comprising two concentric conductor mediums that are tubular, a solid center conductor and intermediate insulating material that separates the conductors, and threaded connections for said sections, substantially as described.

2. A composite electric conductor composed of a series of concentric conductor mediums that are tubular, a solid center conductor that is cylindric, and annular insulations interposed between adjacent conductors that are graded for length at the ends, the longest being central and all the ends externally threaded to engage with a composite coupling, substantially as described.

3. A coupling for composite conductor-sections, composed of concentric tubular pieces that are graded in length and diameter and have annular insulating mediums intervening between adjacent coupling-pieces, substantially as described.

4. A coupling for composite conductor-sections, that is composed of T-pieces which are hollow and internally threaded at the ends, said pieces being graded for length and diameter and held concentric by interposed insulations that completely fill spaces between the T-pieces, substantially as described.

CHAS. A. MEZGER.

Witnesses:
E. M. CLARK,
WM. P. PATTON.